(12) United States Patent
Dorner

(10) Patent No.: US 8,982,356 B2
(45) Date of Patent: Mar. 17, 2015

(54) FIBER OPTIC INTERFEROMETER AND METHOD FOR DETERMINING PHYSICAL STATE PARAMETERS IN THE INTERIOR OF A FIBER COIL OF A FIBER OPTIC INTERFEROMETER

(75) Inventor: Georg Dorner, Bad Krosingen (DE)

(73) Assignee: Northrop Grumman LITEF GmbH, Freiburg (DE)

( * ) Notice: Subject to any disclaimer, the term of this patent is extended or adjusted under 35 U.S.C. 154(b) by 631 days.

(21) Appl. No.: 12/737,901

(22) PCT Filed: Jul. 17, 2009

(86) PCT No.: PCT/EP2009/005219
§ 371 (c)(1),
(2), (4) Date: Feb. 28, 2011

(87) PCT Pub. No.: WO2010/022822
PCT Pub. Date: Mar. 4, 2010

(65) Prior Publication Data
US 2011/0149293 A1 Jun. 23, 2011

(30) Foreign Application Priority Data
Aug. 28, 2008 (DE) .......................... 10 2008 044 810

(51) Int. Cl.
*G01C 19/64* (2006.01)
*G01C 19/72* (2006.01)
*G01B 9/02* (2006.01)

(52) U.S. Cl.
CPC .................................... *G01C 19/721* (2013.01)
USPC ............ 356/460; 356/465; 356/459; 356/477

(58) Field of Classification Search
CPC .... G01C 19/726; G01C 19/72; G01C 19/721; G01C 19/722; G01D 5/35322
USPC .......................... 356/459, 460, 465, 477, 462
See application file for complete search history.

(56) References Cited

U.S. PATENT DOCUMENTS

| | | | |
|---|---|---|---|
| 5,636,021 A * | 6/1997 | Udd ............................... 356/483 |
| 6,052,179 A * | 4/2000 | Prohaska et al. .............. 356/73.1 |
| 7,697,144 B2 * | 4/2010 | Sanders et al. ................ 356/465 |
| 2005/0191008 A1 * | 9/2005 | Anson et al. .................... 385/39 |
| 2007/0121117 A1 * | 5/2007 | Chen .............................. 356/460 |

(Continued)

FOREIGN PATENT DOCUMENTS

| EP | 0 172 391 B1 | 2/1986 |
| EP | 0 987 518 A2 | 3/2000 |
| WO | WO 2008/003071 A2 | 1/2008 |

(Continued)

*Primary Examiner* — Tarifur Chowdhury
*Assistant Examiner* — Sunghee Y Gray
(74) *Attorney, Agent, or Firm* — Elliott N. Kramsky

(57) ABSTRACT

A fiber-optic interferometer comprising an optical fiber wound to form a fiber coil into which two partial light beams of a first light source can be coupled. The Bragg structure is integrated into the fiber coil. Said Bragg structure comprises an optical fiber having a periodically varying refractive index. In a method for determining physical state parameters in the interior of a fiber coil of a fiber optic interferometer information about physical state parameters in the interior of the fiber coil is obtained on the basis of the reflection wavelength of a Bragg structure comprising an optical fiber having a periodically varying refractive index is integrated into the fiber coil.

4 Claims, 2 Drawing Sheets

(56) References Cited

U.S. PATENT DOCUMENTS

2010/0053631 A1\* 3/2010 Kitamura ................. 356/461
2011/0037972 A1\* 2/2011 Bergh ..................... 356/73.1

FOREIGN PATENT DOCUMENTS

| WO | WO 2008/089208 A2 | 7/2008 |
| WO | WO 2008/157405 A2 | 12/2008 |

\* cited by examiner

FIBER OPTIC INTERFEROMETER AND METHOD FOR DETERMINING PHYSICAL STATE PARAMETERS IN THE INTERIOR OF A FIBER COIL OF A FIBER OPTIC INTERFEROMETER

BACKGROUND

1. Field of the Invention

The present invention relates to a fiber optic interferometer and a method for determining physical state parameters in the interior of the coil of a fiber optic interferometer.

2. Description of the Prior Art

Fiber optic interferometers are employed, inter alia, for measuring rotational speeds. To accomplish this, a light beam is split into two partial beams, guided in opposite directions in a circle, to meet one another again after one or more circulations. The interference pattern of the two superimposed partial beams changes if the fiber optic interferometer is rotated about an axis perpendicular to the beam plane, as the optical paths of the two partial beams are no longer of equal lengths.

The resulting interference pattern is not only a function of rotational speed, but may also depend on external parameters such as temperature. Since fiber optic interferometers are employed worldwide today over a wide range of applications, they must possess consistent operating behavior under demanding conditions (e.g., over a temperature range of −55° C. to 90° C.). This is achieved by the use of individual sensors calibrated over the operationally-required temperature range.

During calibration, fiber optic interferometer output signals, a function of the phase shift of the two light beams traveling in opposite directions, are detected with known external parameters. Thereafter, a suitable mathematical model is determined as a function of an input parameter (e.g., the currently prevailing ambient temperature) and stored in the memory of the fiber optic interferometer signal processor. During operation, the measured data are then evaluated as a function of the input parameter. This can only represent an approximation, however, as the properties of the fiber optic interferometer are dependant upon not only a single input parameter such as temperature, but on a multiplicity of parameters which (to a first approximation) are physically independent of or interact with one another (e.g., temperature and expansion due to temperature-dictated change in length of the fiber). The properties of the fiber optic interferometer also depend on temporal profiles of temperature at a given location (i.e. temperature transients) or at different locations at a given time (i.e. temperature gradients). Using the example of temperature, this can be explained in greater detail in a simple way: the propagation time of light in the core of the optical fiber is dependent on the length of the optical fiber and such length changes as a result of material expansion due to temperature increase. It is also dependent on the refractive index n within the optical fiber. The refractive index depends in turn both directly (due to the material property of the fiber) and indirectly on temperature as a change in length of the fiber due to temperature is accompanied by varying, spatially locally distributed mechanical stresses σ in the inner fiber core of the wound fiber that can lead to a change in refractive index n. When local mechanical stresses on the fiber are intensified, cross-couplings between the fast and the slow axes of a polarization-maintaining optical fiber can also occur that result in considerable changes in propagation time. For precise calibration of a fiber optic interferometer, it is thus desirable to obtain metrological access to the state parameters at the interior of the optical fiber using conventional measurement methods. A calibration preceding operation of the sensor has the disadvantage that the conditions under which the sensor is intended to be used must be previously defined. The calibration is then only valid within such previously-defined conditions.

In order to determine the temperature-dependent behavior of a fiber optic interferometer, it is known to use one or more temperature sensors, usually based on semiconductors, individually or simultaneously in an assemblage. They are often arranged in the vicinity of the interferometer, the phase modulator or directly on the topmost layer of the optical fibers wound to form a coil. In such an arrangement, however, it is not possible to directly measure the instantaneous state at the interior of the optical fiber. Thus, the measured temperature is not necessarily that at the interior of the optical fiber as complex conditions of heat transport from the surroundings of the fiber into the interior of the fiber arise due to the different heat capacities of the materials used in the fiber optic interferometer. An external change in ambient temperature will have an effect some time later in the interior of the optical fiber. Such time is temporally and spatially dependent on many, mainly unknown, parameters and, consequently, can only be determined to an approximation. Additionally, an identical temperature does not necessarily produce the same propagation time of the light beam. For example, as a result of hysteresis, should a specific temperature be established after a cooling or heating process, other internal states can be established with the same temperature conditions at the core of the optical fiber. In that case, the same measured temperature is then present and there is compensation to the same extent in both cases, even though the actual propagation times of the light beams are different.

A possible method for eliminating such disadvantages might be, for example, to wind conventional semiconductor temperature sensors and/or pressure sensors together with the optical fiber to form the fiber coil. Technical procedural difficulties would occur, however, when winding the optical fiber, such as the rebound of the optical fiber as a result of bulges within the coil at the locations of the sensors. The sensors within the coil could additionally produce local changes in mechanical stresses in the optical fibers wound below and/or above them, that, in turn, would influence the profile of light propagation times due to the influence of mechanical stresses on the refractive index of the fiber core material.

SUMMARY AND OBJECTS OF THE INVENTION

It is therefore an object of the present invention to provide a fiber optic interferometer in which information about physical state parameters at the interior of the fiber coil can be simply obtained using known measurement methods.

In a first aspect, the invention provides a fiber optic interferometer comprising an optical fiber wound to form a fiber coil into which two partial light beams of a first light source can be coupled. A Bragg structure is provided that is integrated into the fiber coil. The Bragg structure comprises an optical fiber having a periodically varying refractive index.

In a second aspect, the invention provides a method for determining physical state parameters in the interior of a fiber coil of a fiber optic interferometer of the type in which two partial light beams are coupled into an optical fiber that is wound to form the fiber coil. According to the method, information about physical state parameters in the interior of the fiber coil is obtained based on the reflection wavelength of a Bragg structure that is integrated into the fiber coil. Such Bragg structure comprises an optical fiber having a periodically varying refractive index.

The preceding and other features and advantages of the invention will become further apparent from the detailed description that follows. Such description is accompanied by a set of drawing figures. Numerals of the drawing figures, corresponding to those of the written description, point to the features of the invention with like numerals referring to like features throughout.

DETAILED DESCRIPTION OF THE PREFERRED EMBODIMENT

Figure 1:
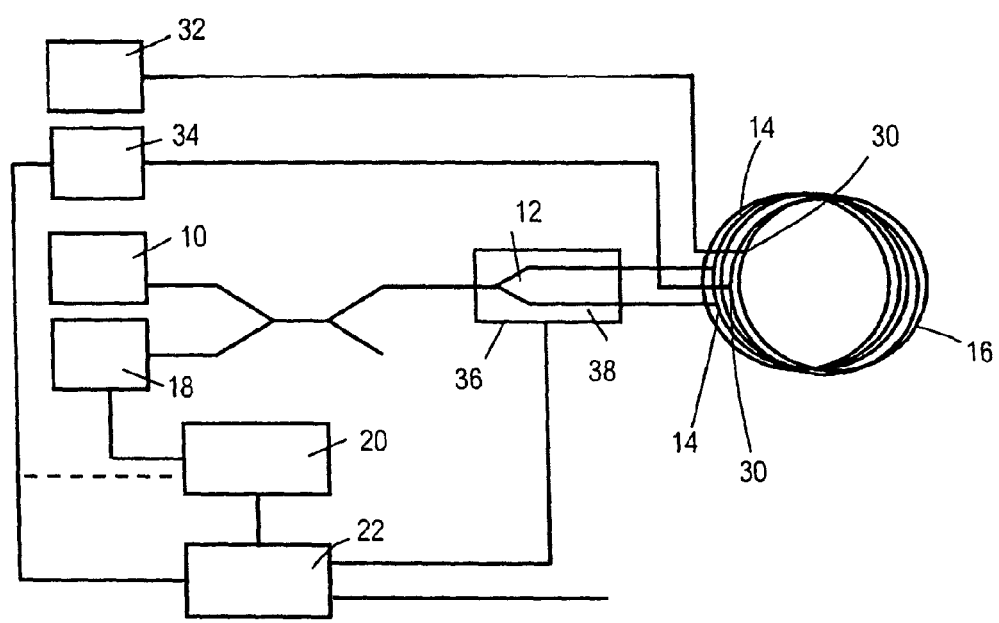
FIG. 1 is a schematic diagram of a fiber optic interferometer according to a first preferred embodiment of the invention comprising an arrangement for determining physical state parameters in the interior of the fiber coil.

FIG. 1 is a schematic diagram of a first embodiment of a fiber optic interferometer in accordance with the invention. The fiber optic interferometer of FIG. 1 is a so-called Sagnac interferometer for determining a rotational speed acting on the arrangement. It has a first light source 10, the output beam of which is directed to a coupler 12 that can act as a beam splitter as well as a coupler depending on the direction of the light beam. In the coupler 12, the light beam coming from the first light source 10 is split into two partial light beams that are radiated in opposite directions into an optical fiber 14. The optical fiber 14 is wound on a carrier (not illustrated) to form a fiber coil 16. After passing through the optical fiber 14, the two partial light beams propagating in opposite directions are combined to form a light beam in the coupler 12. The light beam produced by superimposition of the two partial light beams is directed to a first photodetector 18, the output of which is a measure of the intensity of the light beam impinging on the photodetector 18. The output of the photodetector 18 is transmitted to a signal processing device 20, 22 of the fiber optic interferometer. The signal processing device comprises an analog unit 20 and a digital unit 22.

Rotational speeds can be determined in a known manner by means of the described fiber optic interferometer. Rotation of the fiber coil 16 about an axis perpendicular to the beam plane produces different propagation times for the two partial light beams passing through the optical fiber 14. The different propagation times result in a phase shift of the two partial light beams with respect to one another at the output of the fiber coil 16. The magnitude of such phase shift is a function of the speed of rotation. Changing phase shifts lead to changing interference patterns, reflected in different intensities at the photoreceptor 18.

Figure 3:
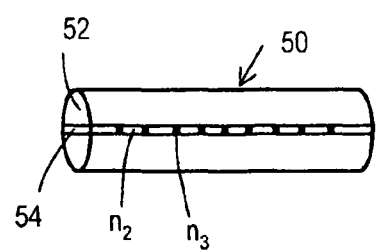
FIG. 3 is a schematic perspective view of a Bragg structure comprising an optical fiber having a periodically varying refractive index.

According to the invention, a Bragg structure is integrated into the fiber coil 16 that comprises an optical fiber having a periodically varying refractive index. Such a Bragg structure 50 is shown in schematic perspective view in FIG. 3. The Bragg structure 50 comprises an optical fiber 52, the core 54 of which is formed from material having a periodically modulated refractive index $n_2$, $n_3$.

In the embodiment of FIG. 1, an additional optical fiber 30 is wound onto the carrier in parallel with the optical fiber 14 forming a part of the fiber coil 16. The optical fiber 52 of the Bragg structure 50 forms a section of the additional optical fiber 30; that is, a section of the optical fiber 30 has a core material whose refractive index varies periodically. The optical fiber 30 is coupled to a second light source 32 so that light from the second light source 32 enters into the optical fiber 30 and passes through it in one of two directions. The light that has passed through the optical fiber 30 is applied to a second photodetector 34. The output of the second photodetector 34 is likewise fed to the signal processing device of the fiber optic interferometer.

The periodically modulated refractive index of the core material in at least one section of the optical fiber 30 results in the reflection of a portion of the light that passing through the optical fiber 30 within a narrow wavelength range. The reflection wavelength $\lambda_B$, (at which a fiber Bragg grating has a reflective effect) is determined by the relationship $\lambda_B = 2 n_{eff} \Lambda$, where $n_{eff}$ is the average refractive index of the fiber core and $\Lambda$ is the period of the modulated structure. The grating period $\Lambda$ is a function of temperature and expansion of the optical fiber at the location of the fiber Bragg grating. As a result of the change in the reflection wavelength $\lambda_B$, it is possible to deduce changes in the temperature and/or the stress at the location of the grating. To do this, the light which emerges from the optical fiber containing the grating is analyzed spectrally with high resolution.

In the arrangement of FIG. 1, the light that has emerged from the optical fiber 30 is spectrally analyzed in the second photodetector 34. It is possible to examine either the transmitted portion of the fiber Bragg grating (i.e., the portion that contains the wavelength range of light emitted by the second light source) with the exception of the reflection wavelength $\lambda_B$ of the fiber Bragg grating, or the reflected portion of the fiber Bragg grating, which includes the range of the reflection wavelength $\lambda_B$. Since the two portions have different propagation times through the optical fiber 30 and, thus, emerge from the optical fiber 30 with a time delay, the two signals can be spectrally analyzed separately from one another. In this way it is possible to determine a change in the reflection wavelength $\lambda_B$ brought about by temperature change and/or a change in mechanical stress at the fiber Bragg grating. The information obtained at the photodetector 34 is fed to the signal processing device 20, 22.

Information about physical state parameters such as temperature and mechanical stress in the interior of the fiber coil 16 can be used to adjust the measurement data from the fiber optic interferometer to the determined state parameters to account for possible corruption of the measurement signal resulting from changes in the temperature and/or mechanical stress in the interior of the fiber coil. Since the relative propagation times of the partial light beams with respect to one another are not only a function of speed of rotation, but also temperature changes, a change in mechanical stresses and/or refractive index changes, phase shifts brought about by changes in such parameters have to be taken into account in evaluation of the measurement signal. This can be accomplished, for example, by corresponding phase modulation of one of the partial light beams at the output of the optical fiber 14. This compensates for a propagation time change brought about by a temperature change and/or change in mechanical stresses. For this purpose, the coupler 12 is preferably part of an integrated optical component 36 comprising a phase modulator 38 alongside the coupler 12.

Figure 2:
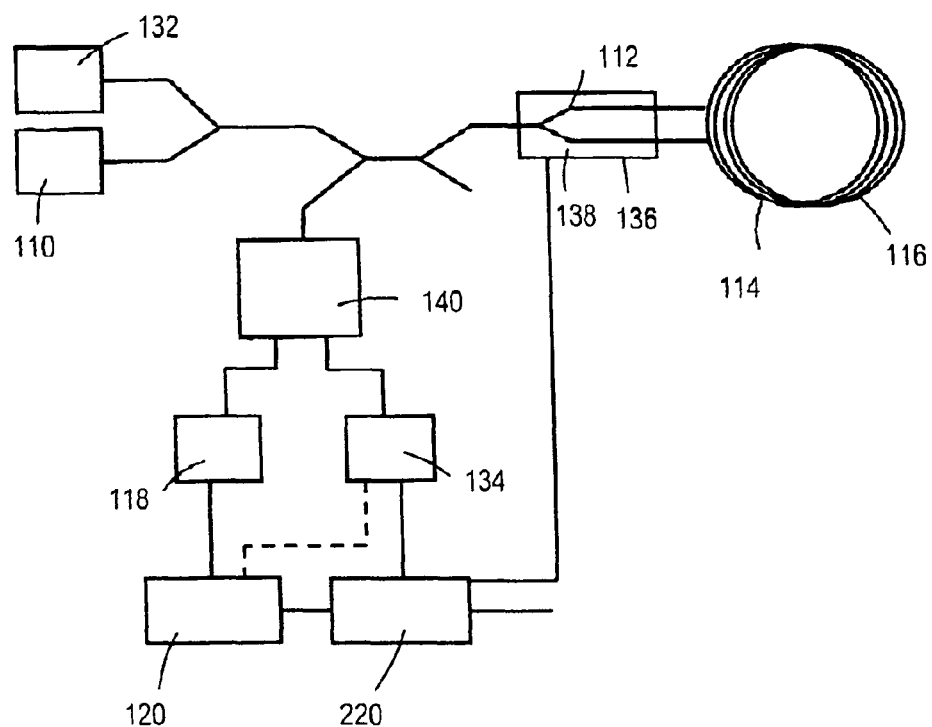
FIG. 2 is a schematic diagram of a fiber optic interferometer according to a second preferred embodiment of the invention.

FIG. 2 is a schematic diagram of a fiber optic interferometer in accordance with a second embodiment of the invention. In FIG. 2, technical features corresponding to the embodiment of FIG. 1 are indicated by like reference symbols, increased by 100 in each case. The exemplary embodiment of FIG. 2 differs from that of FIG. 1 in that the optical fiber 52 of the Bragg structure 50 does not comprise sections of an optical fiber 30 wound onto the carrier separately from the optical fiber 14, but rather forms sections of the optical fiber 114 itself. In this embodiment, therefore, both the light emitted by the first light source 110 and that emitted by the second light source 132 pass through a common optical fiber 114, which is provided in sections with at least one fiber Bragg grating. The wavelength range of light emitted by the second light source 132 does not overlap that of the light emitted by the first light source 110. In this way, the light returning from the fiber coil 116 can be spectrally selected upstream of the first photodetector 118 and the second photodetector 134 and assigned to the corresponding detector 118 or 134. For this, a wavelength-selective component 140 (e.g. a fiber optic filter) is provided, in which the light beam coming from the coupler 112 is discriminated according to wavelength range. As in the first embodiment, both the output of the second photodetector 134, which serves for evaluating the partial light beams circulating in opposite directions and, hence, for determining the speed of rotation, and that of the first photodetector 118, which determines physical state parameters in the interior of the fiber 114, are fed to the signal processing device 120, 122 of the fiber optic interferometer.

The fiber optic interferometer in accordance with a first preferred exemplary embodiment as shown FIG. 1 has the advantage that, as a result of the configuration of separate optical fibers 14, 30 of the fiber optic interferometer and the Bragg structure, the process for determining physical state parameters in the interior of the fiber coil is independent of the operation of the fiber optic interferometer and, thus, of the actual measuring device. In the embodiment of FIG. 1, as opposed to that of FIG. 2, it is additionally necessary to wind a second optical fiber 30 (together with the interferometer optical fiber 14) to form the fiber coil 16. This can lead to increased production costs, an additional space requirement and additional weight.

Since only a small portion of the light is reflected at a fiber Bragg grating, it is also possible to introduce a plurality of fiber Bragg gratings at different locations of the optical fiber 30 (and/or optical fiber 114) without disturbing light losses. In order to detect a delay of the propagation time of one of the partial light beams relative to that running in the opposite direction as a result of refractive index changes and/or a change in mechanical stresses within the fiber, there are no preferred locations for the fiber Bragg gratings in the optical fiber. Such non-reciprocal propagation time changes can occur, in principle, anywhere in the fiber. In order to detect propagation time changes due to cross-coupling, the fiber Bragg gratings are preferably located at the coil ends and, to a lesser extent, in the coil center. This is due to the short coherence length of the light beams. Only those cross-coupled lights which have cross-coupled within very specific locations in the optical path have an influence on the interference signal of the light beams. The unambiguous assignment of the reflected or transmitted lights to locations of the fiber Bragg gratings is effected by the resultant propagation time differences of the lights from such spatially distant Bragg structures to the optical read-out unit 34 (or the unit 134).

In the fiber optic interferometer according to the invention, a Bragg structure is integrated into the fiber coil, which comprises an optical fiber having a periodically varying refractive index. The reflection wavelength of a Bragg structure is a function of the grating period of the structure, which changes with the temperature and expansion of the fiber. Since the Bragg structure is integrated into the fiber coil, information about physical state parameters in the interior of the fiber coil can be obtained directly by measurement of the reflection wavelength of the Bragg structure. Propagation time differences between the two partial light beams running in opposite directions, brought about by a temperature change and/or change in mechanical stresses, can be precisely compensated.

The present invention furthermore provides a method by means of which physical state parameters in the interior of the fiber of a fiber coil of the fiber optic interferometer can be obtained in a simple manner and using known measurement methods.

In the method according to the invention, information about physical state parameters in the interior of the fiber coil is obtained on the basis of the reflection wavelength of a Bragg structure integrated into the fiber coil comprising an optical fiber having a periodically varying refractive index. Possible changes in the temperature and/or mechanical stress of the fiber can be determined by virtue of the integration of the Bragg structure into the fiber coil of the fiber optic interferometer at the location at which relative shifts in the propagation time of the two partial light beams running in opposite directions can occur.

The fiber optic interferometer and method according to the invention thus make it possible to determine physical state parameters acting on the fiber optic interferometer during operation. It is thus possible not only to operate the fiber optic interferometer under previously defined conditions, but also to react to external influences not specifically defined beforehand. The fiber optic interferometer and method of the invention furthermore make it possible to determine physical state parameters such as temperature and mechanical stress as well as the temporal and spatial changes thereof directly in the interior of the fiber coil using a known measurement method. As a result, the extent to which the measurement signal is corrupted can be determined very accurately.

While this invention has been described with reference to its presently preferred embodiment, it is not limited thereto. Rather the invention is limited only insofar as it is defined by the following set of patent claims and includes within its scope all equivalents thereof.

What is claimed is:

1. A rotation rate sensor comprising a fiber optic interferometer including a first optical fiber, which is wound to form a first fiber coil and into which two partial light beams of a first light source can be coupled,
the fiber optic interferometer further comprising a second optical fiber including a core material,
wherein a part of the core material of the second optical fiber is embodied as a Bragg structure having a periodically varying refractive index, the second optical fiber being wound in parallel fashion with respect to the first fiber coil to form a second fiber coil.

2. The rotation rate sensor as claimed in claim 1, characterized in that the interferometer has a second light source which is arranged in such a way that a light beam emitted by it can be coupled into the second optical fiber.

3. A method for determining a rotation rate, in which two partial light beams are coupled into a first optical fiber wound to form a first fiber coil of a fiber optic interferometer, and into a second optical fiber wound to form a second fiber coil in parallel fashion to the first fiber coil, the second fiber coil comprising a Bragg structure having a periodically varying index, wherein information about physical state parameters in the interior of the first fiber coil is additionally obtained on the basis of the reflection and/or transmission wavelength of the Bragg structure.

4. The method according to claim 3, further comprising adjusting the measurement data to the determined physical state parameters.

\* \* \* \* \*